Patented May 17, 1938

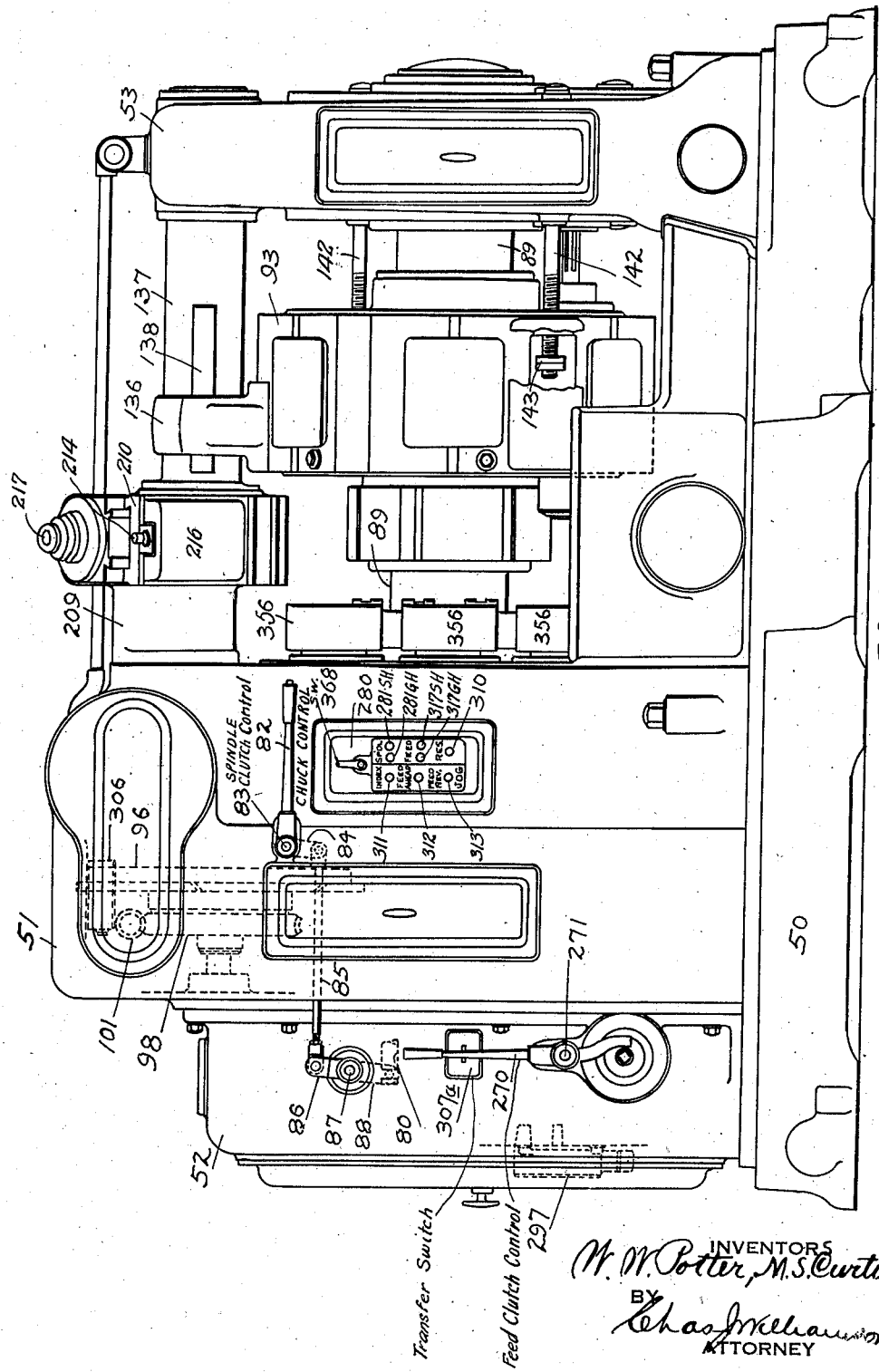

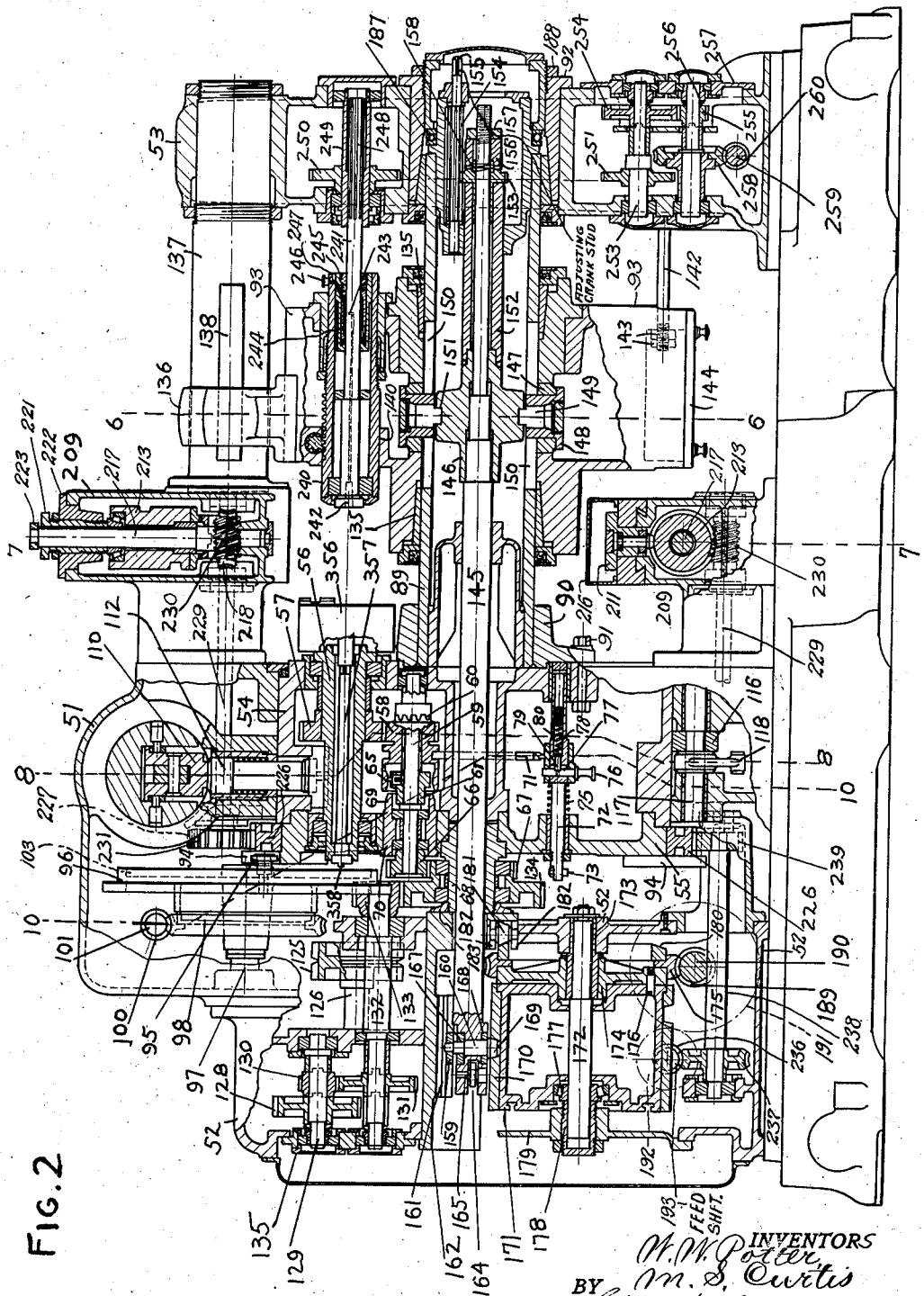

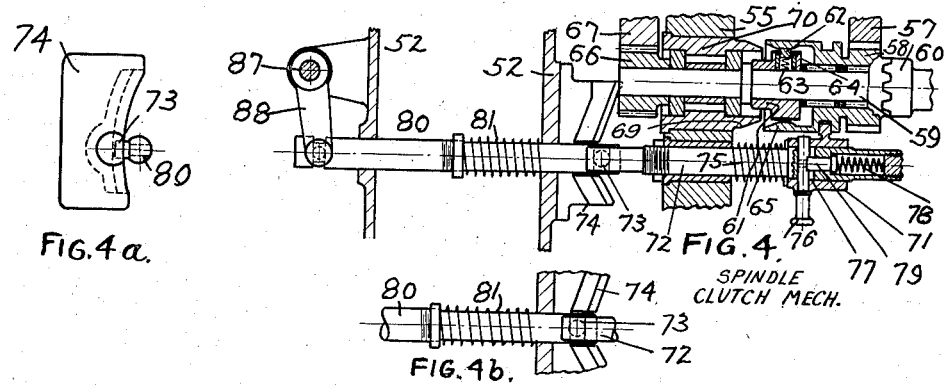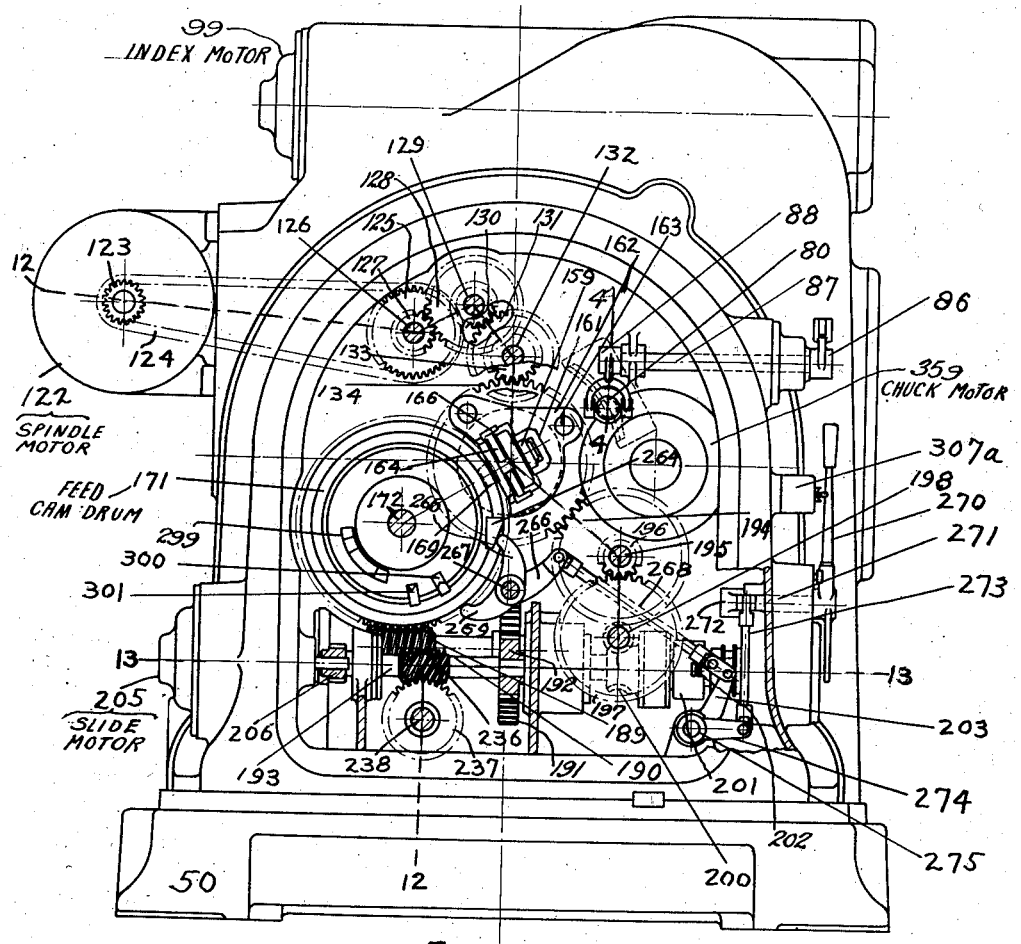

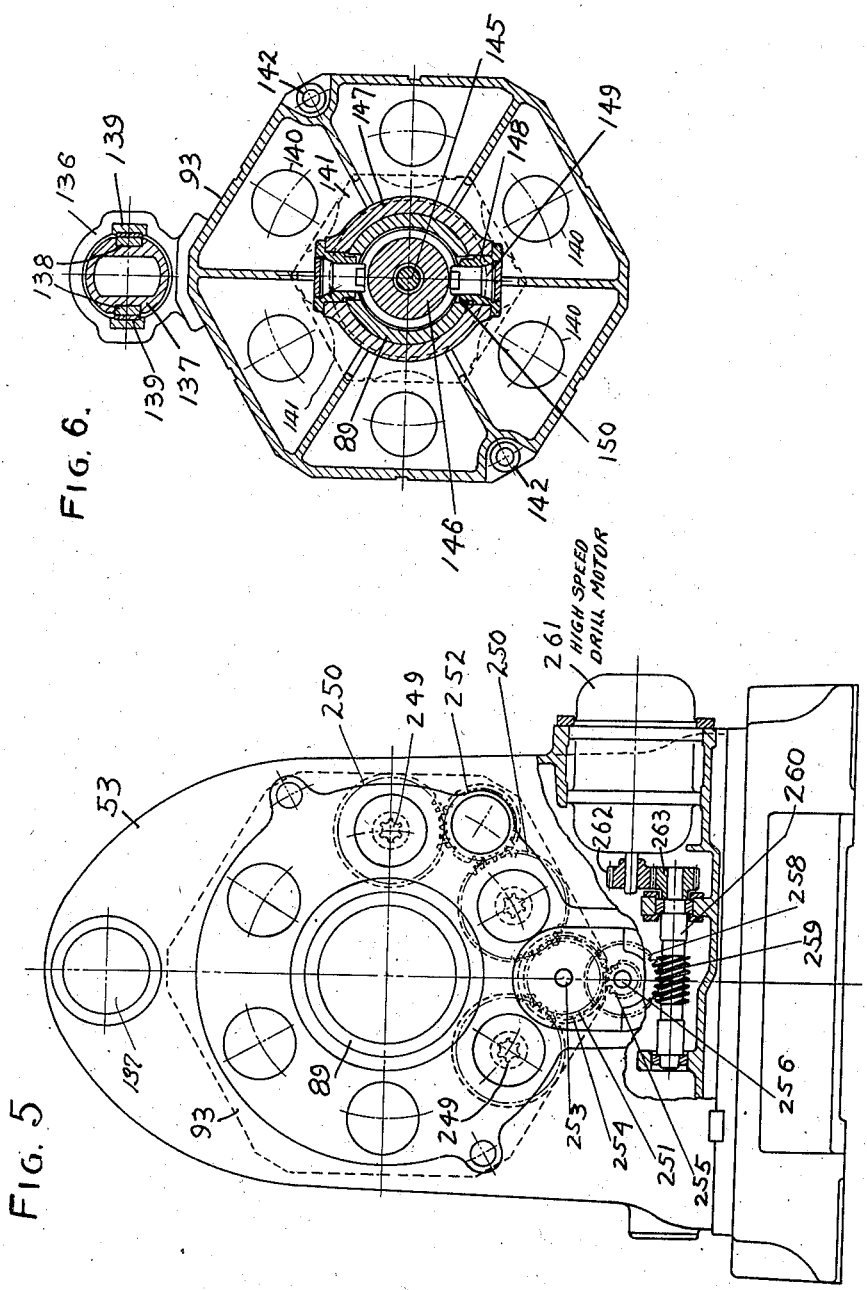

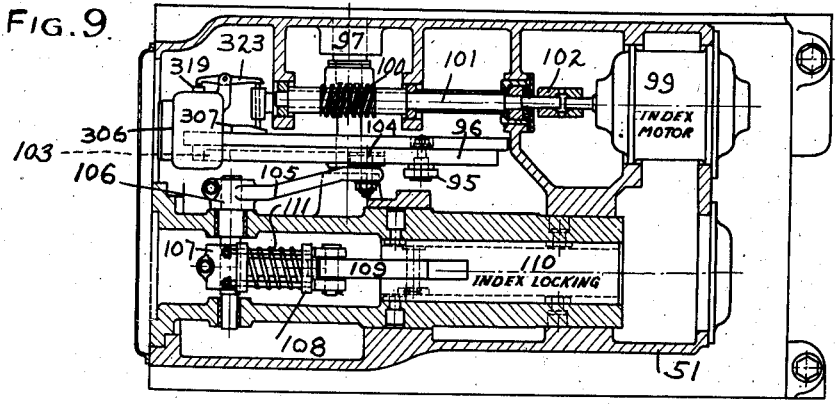
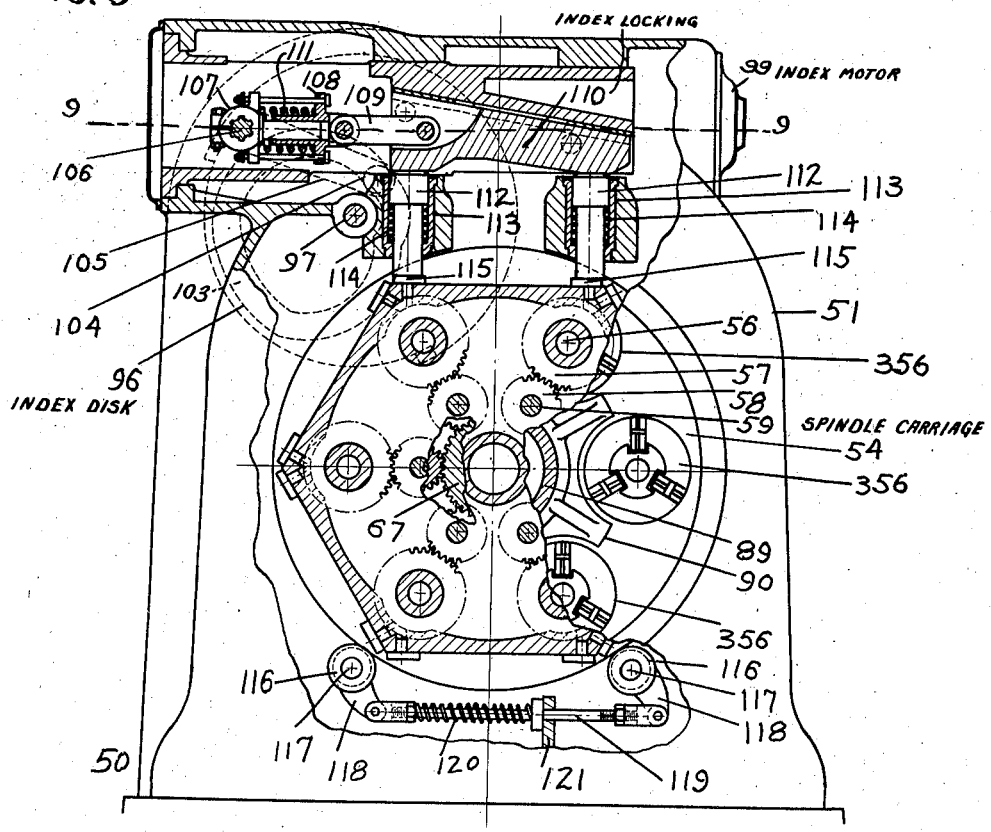

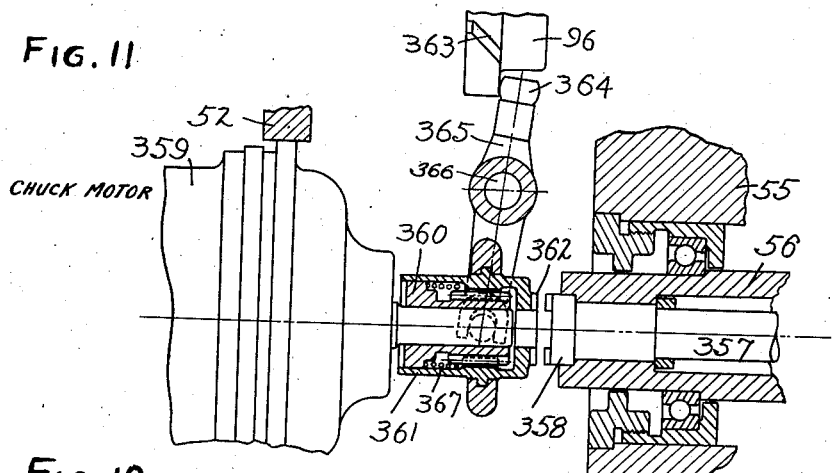
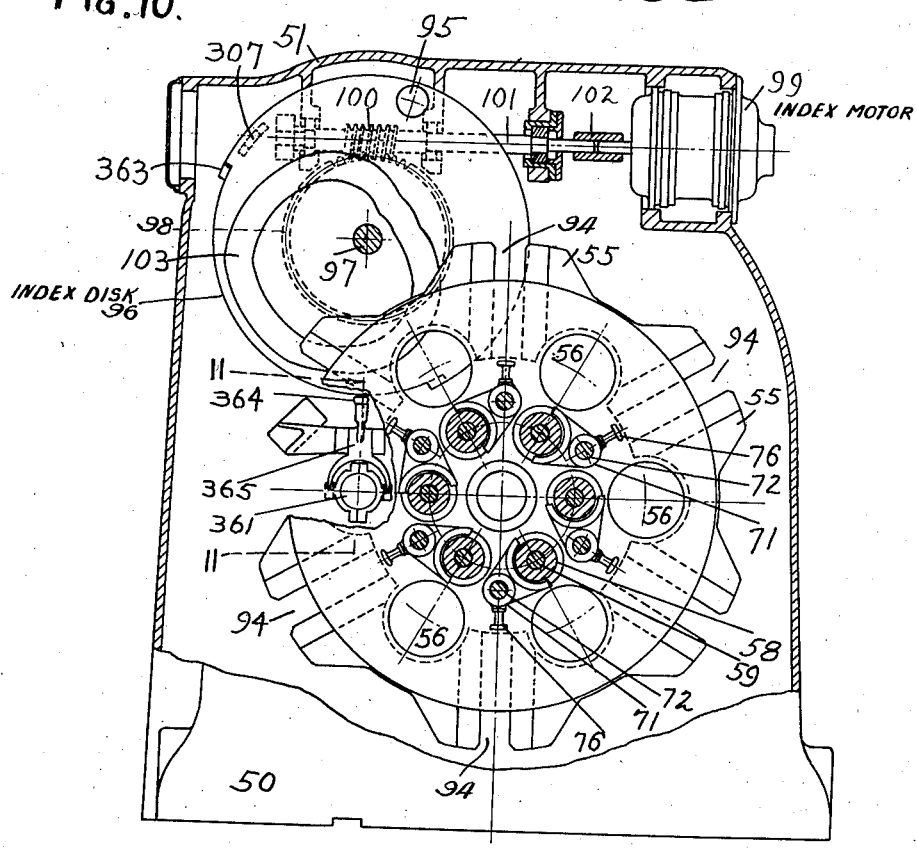

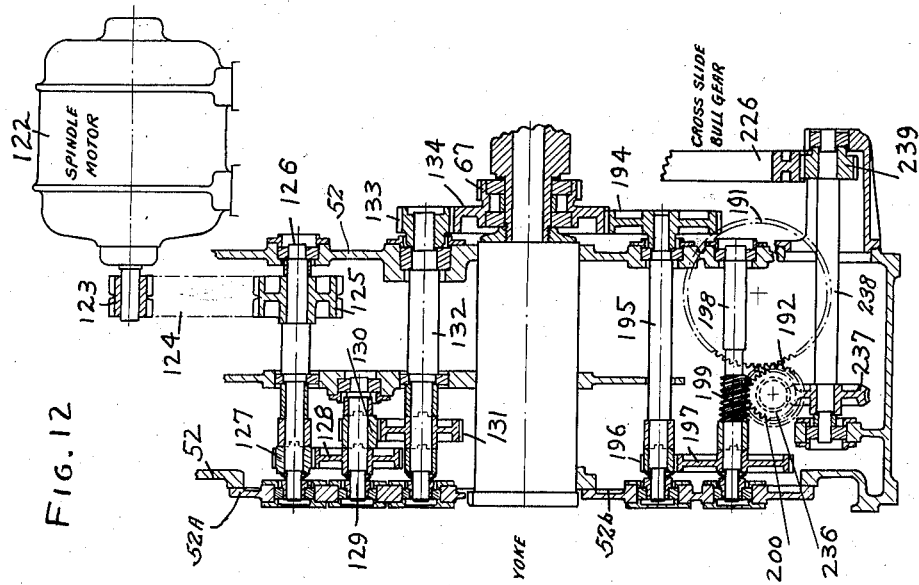
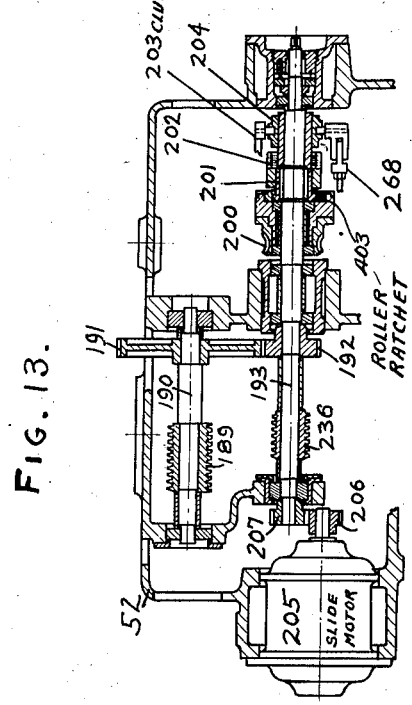

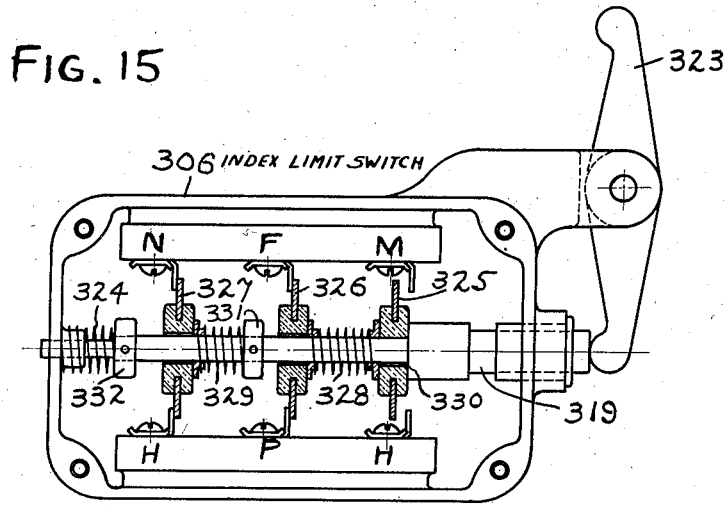
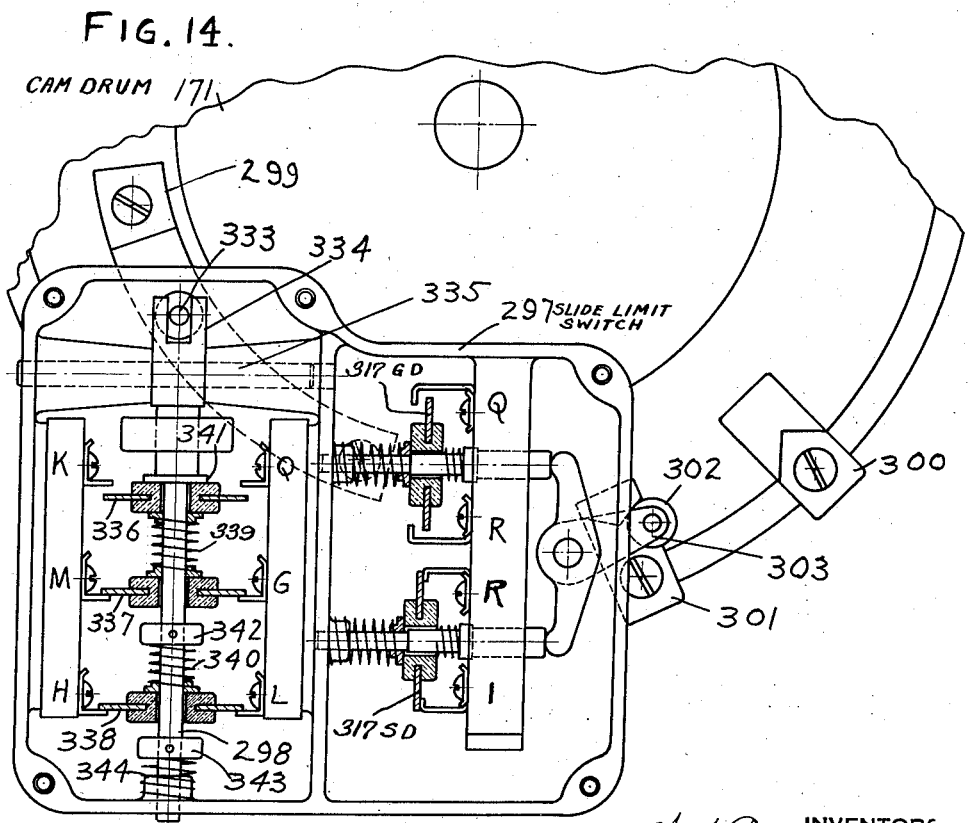

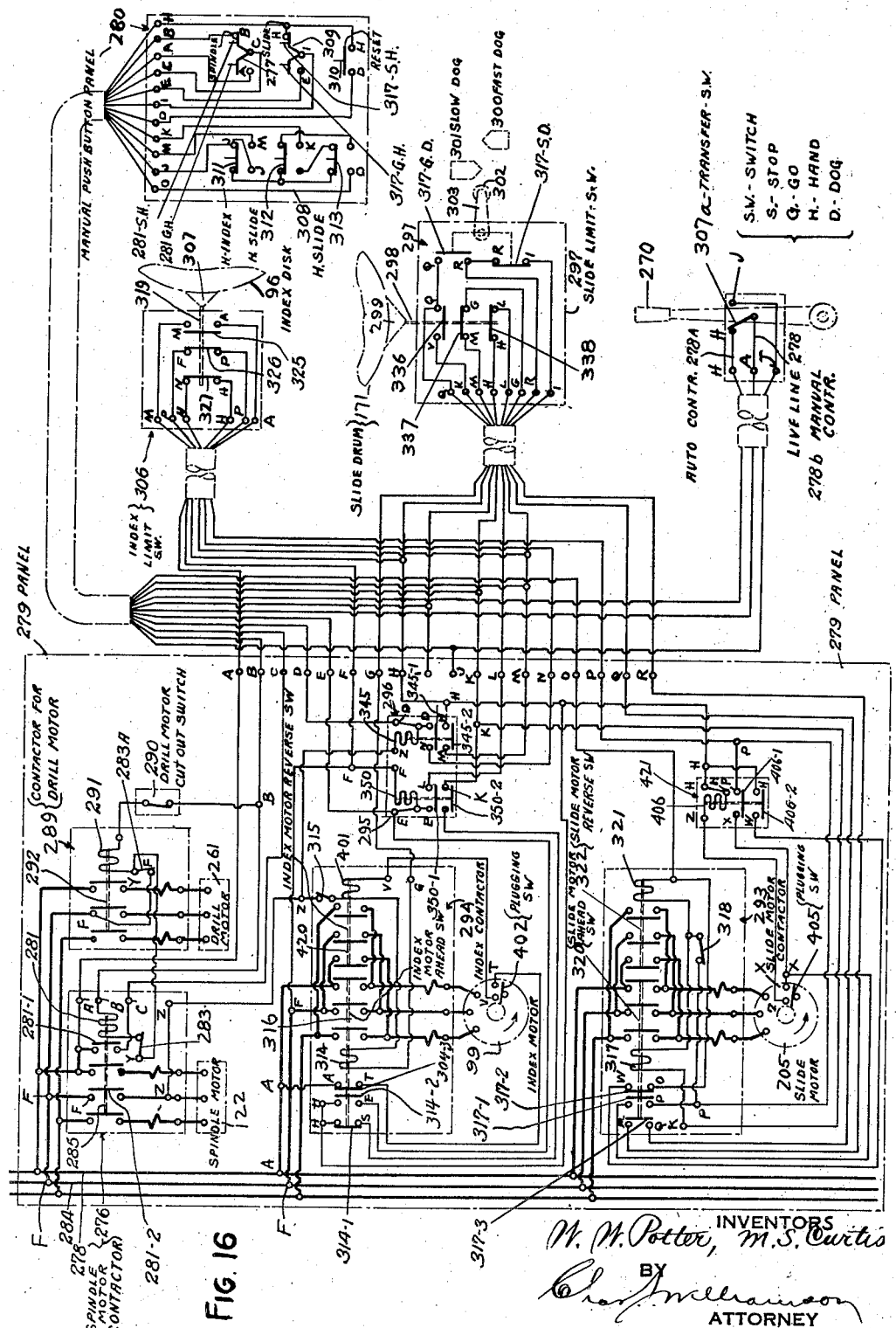

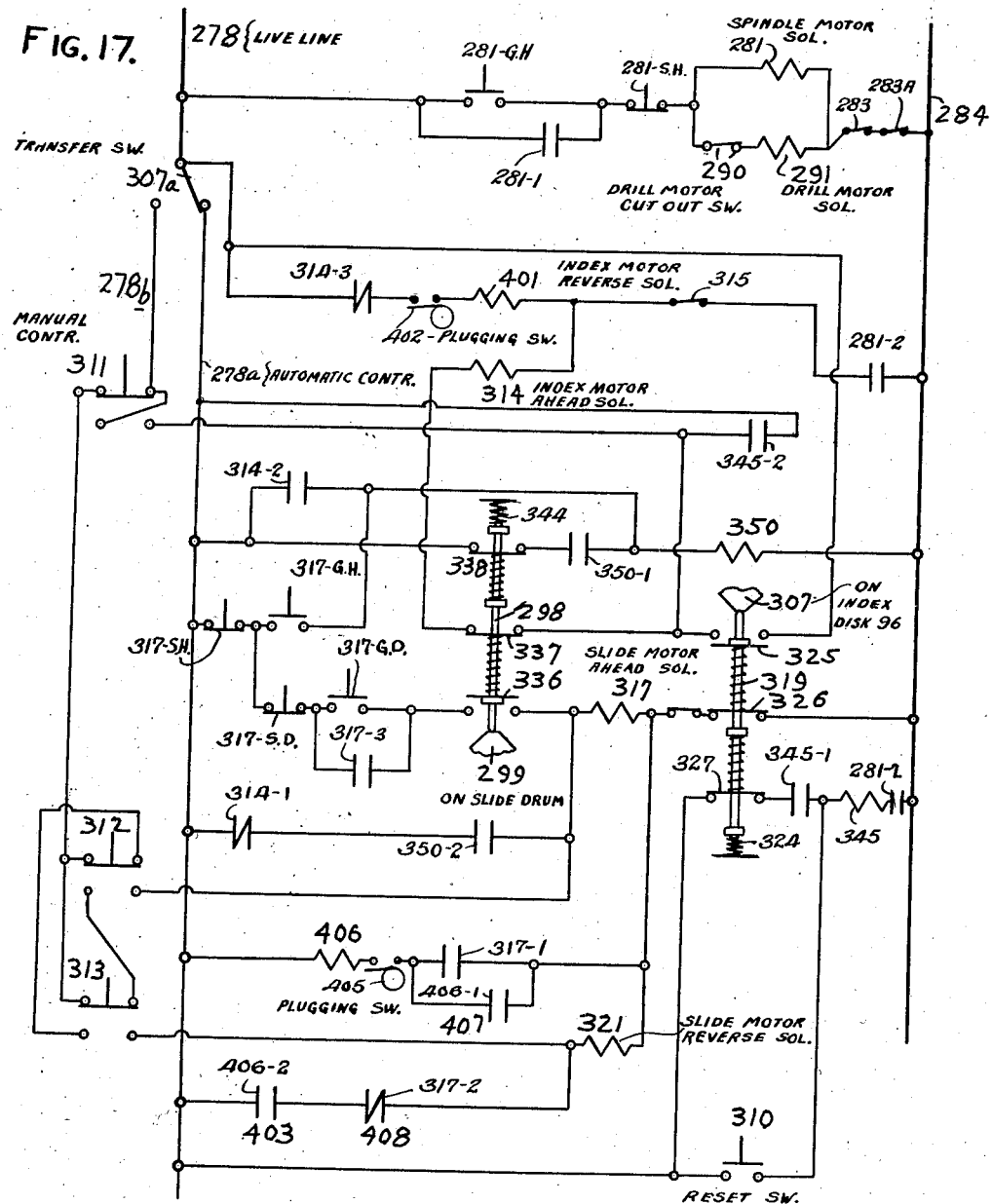

2,118,024

UNITED STATES PATENT OFFICE 2,118,024

MACHINE TOOL

William Wallace Potter and Myron S. Curtis, Pawtucket, R. I.; said Curtis assignor to said Potter Application June 4, 1931, Serial No. 542,156
Renewed July 9, 1937

52 Claims. (Cl. 29—38)

Our invention relates to metal working machines of the type which have work carriers and coacting tool slides or holders mounted for periodic movement relative to one another for bringing them into and out of working relation, and for the performance of the desired operations on the work pieces. As one embodiment of the invention, we show such a machine of the multi-spindle work-revolving indexing type, but do not limit the invention to that particular embodiment because some of the characteristics of our invention are suitable and useful in other types of machine-tools. Among the features of the present invention are the following:

1. Tool slide guiding means that assure easily attained accuracy of the alignment of tool slide and spindle, and indefinite maintenance of the same; the alignment of spindle and tool slide is not affected by wear of the spindle carrier consequent on indexing, or from the action of means used for locating and binding the spindle carrier in its various indexed positions, and is not affected by the distortion of other machine elements, by uneven foundation, heat, etc.

2. So locating and binding the spindle carrier in its indexed positions, whereby it is positively locked and is clamped by the same mechanism which locks it,—the locking and clamping mechanism not affecting the alignment of the spindle carrier and the tool slide, and doing this by means that require the minimum of joints between the spindle and the tool slide, with the result that the wearing qualities are improved and there are fewer chances of misalignment.

3. Feeding or traverse of the tool slide is effected by force applied to move the slide that is central in respect to the various tool positions; access of all dirt, etc., is excluded; the various thrusts are self-supported and adjustment is easy.

4. The angular alignment of the tool slide with the spindle is simple, positive and easily adjustable so that the original alignment can be easily attained and maintained.

5. So mounting and driving cross slides as to permit cross slides being applied at any or all spindle stations with the minimum of connections and also to permit of the cross slide feed, usually a cam, to be different for the different cross slides and to be easily and conveniently removed and to permit variation of the relation between the various slides to be conveniently effected and by simple means.

6. A clutch for clutching and declutching each spindle as it arrives at a loading station, by which the clutch teeth are brought to approximately equal peripheral speeds before meshing, and the spindle at the loading station can be clutched or declutched by hand.

7. The minimum of parts for operating the chuck at the loading station and an operating mechanism that is automatically thrown in and out of mesh as the spindle comes to and leaves the loading station.

8. So supporting the spindle carrier while indexing that the weight is taken upon anti-friction bearings while indexing, and when indexed a positive metal-to-metal contact is made between the spindle carrier and its housing.

9. So supporting and driving rotating tools in the tool slide, that said tools may be easily applied at any spindle station, and the speed may be easily and conveniently varied and the drive be independent of the drive of the main spindles.

10. Advantageous supply of cutting lubricant to the revolving tools of the tool slide.

11. So driving the members of a machine tool organization that each has its individual driving motor and the motors are interlocked and controlled and thus produce a greatly simplified organization compared with prior machines where the various machine members are geared to and driven from one source of power.

Other characteristics and advantages in mechanical construction will be seen and appreciated from an examination of the accompanying drawings and the detailed description thereof which follows. In such drawings:—

Figure 1 is a front elevation of a machine embodying our invention;

Figure 2 is a longitudinal section substantially on the center line of Figure 1, with some parts displaced for clarity of illustration;

Figure 3 is an end elevation with the door removed;

Figure 4 is a cross section on line 4—4 of Fig. 3 showing on an enlarged scale the spindle clutching mechanism;

Figure 4a is an end elevation of part of Fig. 4;

Figure 4b is a detail view of the rod 88 of Fig. 4 in a different position from that shown in Fig. 4;

Fig. 5 is an elevation partly in section of Fig. 1 of the tool slide end opposite that shown in Fig. 3;

Figure 6 is a cross section substantially on the line 6—6 of Fig. 2, showing the tool slide operating mechanism;

Figure 8 is a cross section substantially on the line 8—8 of Fig. 2 showing the spindle carrier locking mechanism;

Figure 9 is a cross section substantially on the line 9—9 of Fig. 8;

Figure 10 is a cross section substantially on the line 10—10 of Fig. 2 showing the index mechanism;

Figure 11 is a longitudinal section substantially on the line 11—11 of Fig. 10, showing the chuck operation;

Fig. 12 is a section substantially on the line 12—12 of Fig. 3;

Figure 13 is a section substantially on the line 13—13 of Fig. 3;

Figure 14 is a front elevation of the feed limit switch with the cover removed and parts in section;

Figure 15 is a front elevation of the index limit switch with the cover removed and parts in section;

Figure 16 is a diagrammatic view of the switches, contactors, interlocks, wiring, etc., that provide the electrical control;

Figure 17 is a simplified diagrammatic view of the circuit arrangement more completely illustrated in Fig. 16.

Figure 7:
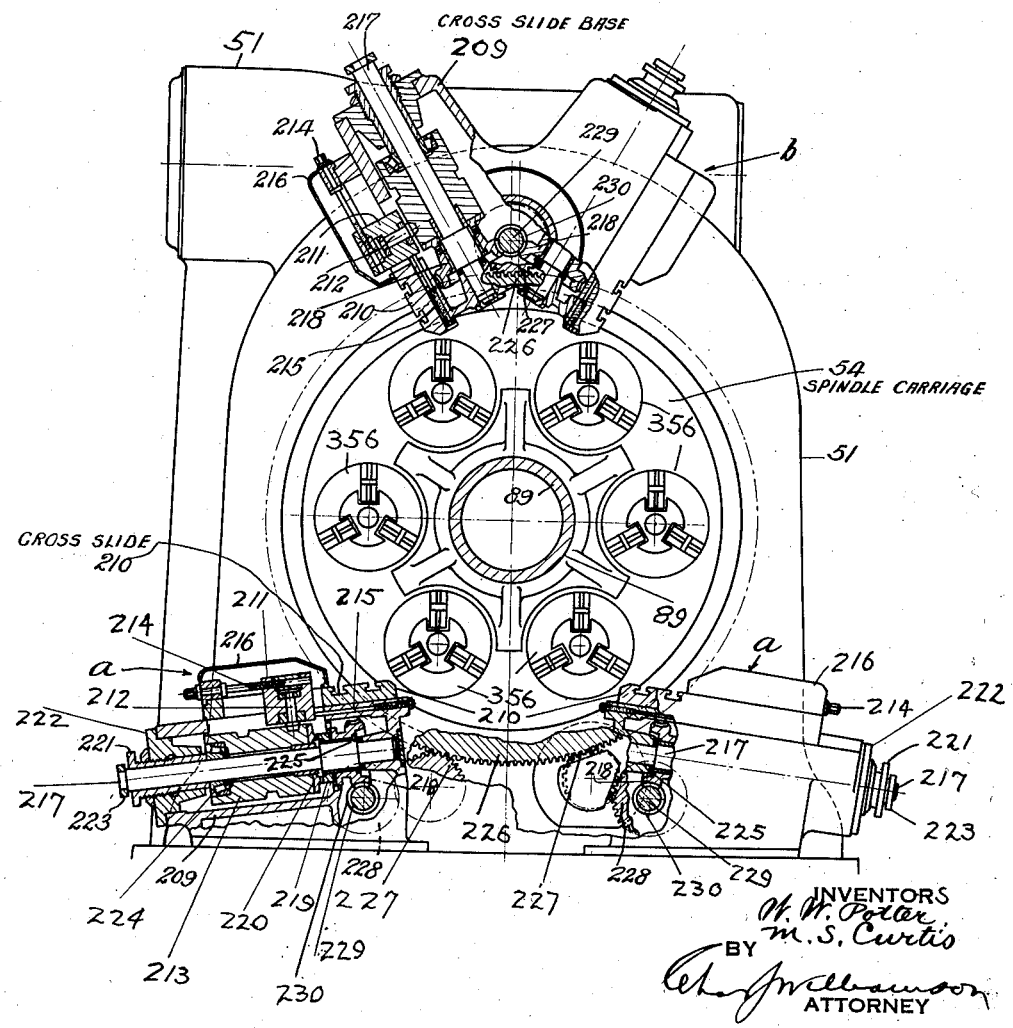
Figure 7 is a cross section substantially on the line 7—7 of Figure 2 showing the cross slides.

The invention consists in whatever is defined by or is included within the terms or scope of the appended claims.

General construction

The main frame and housing (see Figs. 1, 2 and 3) include a bed or base 50 and a spindle carrier housing 51, a gear housing 52 and a rear housing 53 aligned horizontally and firmly bolted to the base. These three housings are bored horizontally and in axial alignment, the two housings 51 and 52 being joined and corresponding to a headstock and the housing 53 spaced therefrom and answering to a tailstock. A compact, sturdy and sightly framework and housing are thus provided. The carrier housing bore contains a cylindrical spindle carrier 54 closed at one end and open at the other end which latter is closed by cover 55 which forms a rear end wall therefor. Opposite portions of these walls of carrier 54 are bored to receive and support in suitable bearings, spindles 56 which, in the machine shown, are six in number, each with its driving and clutching mechanism. These spindles are located equidistant from the center of the carrier and equidistant from each other, and the carrier 54 is indexed through one-sixth of its circumference in a step-by-step manner hereinafter to be described so that the spindles are successively brought to a station at the front of the machine which is hereinafter called the "loading station." As each spindle approaches the loading station, it is automatically declutched and braked, and after it leaves the loading station the brake is automatically released and the clutch engaged.

Spindle and spindle gearing

All the spindles are alike so that description of one will suffice for all.

Fixed to each spindle between its ends is a gear 57 meshing with and driven by a pinion 58 on a shaft 59, but free to revolve thereon and which may move axially of the shaft. Keyed to shaft 59 is a clutch disk 60 with teeth with which corresponding teeth on the pinion 58 can be either meshed or demeshed by axial movement of the pinion 58, and when such teeth are in mesh the spindle is driven from shaft 59.

Also keyed to shaft 59 is collar 61 (see Figs. 2 and 4) carrying in radial holes a series of pins 62 which are impelled outward by springs 63 but which are held from falling out of their respective holes by a plate 64 in each case.

Referring to Figs. 2 and 4, it will be seen these pins coact with an internal cone 65 formed in a flanged rim or extension of pinion 58. When pinion 58 is in its extreme left hand position and unclutched, the pins do not touch the cone, but as pinion 58 is moved to the right to clutch, then the internal cone bears on the outer ends of the pins 62 with enough friction to impart rotation to pinion 58. Further movement of the pinion to the right causes the teeth on the pinion to mesh with the teeth on clutch 60 and when these teeth touch, pinion 58 is running at approximately shaft speed from the frictional drive given by pins 62 and, therefore, there is no clash of teeth in clutching.

When pinion 58 is in its extreme left hand or unclutched position, its internal cone 65 contacts with an external cone 69 on the stationary or fixed sleeve 70 and thus, as the teeth of pinion 58 and gear 57 are always in mesh, acts as a brake to hold the spindle when its rotation is stopped. The pinion 58 is shifted axially on its shaft 59 for the above stated operation by yoke 71 and yoke rod 72. Yoke and rod are shown out of place in Fig. 2 for clarity of illustration, but shown in Fig. 4 in proper relation with pinion shaft 59.

Rod 72 slides horizontally in bearings in end wall of carrier 54 and carrier end plate 55. Fixed to one end is a pin 73 that coacts with a cam 74 (see Figs. 4—4b) which is fastened to housing 52 and therefore stationary. As spindle carrier 54 indexes, pin 73 travels over cam 74 and rod 72 is thereby pulled against the pressure of spring 75, thus declutching pinion 58 from clutch 60, and, as carrier 54 again indexes, cam 74 allows rod 72 to be pushed in the opposite direction by spring 75, thus clutching gear 58 and clutch 60. To allow backlash for wear on brake 69 when clutch rod 72 is pulled by cam 74 to unclutch, yoke 71 is allowed a certain amount of movement along rod 72, this being possible because it is held to said rod by pin 76 which extends diametrically through a slot 77, longitudinal or axial of rod 72. Such pin is normally held against one end of the slot by a spring 78 and plunger 79, but spring 78 yields when pinion 58 and brake cone 69 come in contact. This gives a cushioned, braking effect and allows for wear.

Manual clutching and declutching pinion 58 while in the loading station is provided by having the central portion of cam path 74 formed in the rod 80 (see Figs. 4 to 4b) which rod is slidably mounted in gear housing 52. This rod is normally held at one limit of its movement by a spring 81 which is considerably stronger than spring 75, but it may be moved against such spring in the direction to clutch pinion 58 with clutch collar 60 by hand lever 82 (see Fig. 1) through shaft 83, link 84, connecting rod 85, link 86, shaft 87 and yoke 88 which connects with rod 80 (see Figs. 1 and 4). The pin 73 is in the part of the cam path in the side of rod 80 when this action takes place.

Shaft 59 is supported in carrier 54 by suitable bearings in the carrier end and cover plate 55, and has keyed to its outer end pinion 66 which meshes with and is driven by a central gear 67 mounted by suitable bearings on a sleeve 68 which is supported by the carrier end plate 55.

As there are six spindles 56 and shafts 59 in the carrier 54 located equidistant from the center and from each other, the single central gear 67 drives all shafts 59 and therefore all spindles 56.

The central gear 67, through which all the spindles are driven, receives its power from an individual motor 122 (see Fig. 3), through a train of gearing shown spread out in Fig. 12. Motor 122 has keyed to its shaft a chain sprocket 123 which, through chain 124, drives sprocket 125, keyed to shaft 126, supported by suitable bearings in gear housing 52. To the other end of shaft 126 is removably keyed change pinion 127 which meshes with and drives gear 128 removably keyed to shaft 129 which is also supported by suitable bearings in gear housing 52. Also removably keyed to shaft 129 is pinion 130 which meshes with and drives gear 131, removably keyed to shaft 132, also supported by suitable bearings in gear housing 52. To the end of shaft 132 is keyed pinion 133 which meshes with gear 134 which is an integral part of gear 67. Bearing plate 52a is removably fixed to gear housing 52 and upon its removal, gears 127, 128, 130 and 131 may be removed and interchanged and thus change speed drive connection is provided between motor 122 and central pinion 67.

Spindle carrier indexing and locking

Secured centrally to and projecting axially from the spindle carrier towards the tail-stock end of the machine is a hardened steel slide supporting tube 89. It is solidly attached to the carrier by a flanged collar 90 shrunk and welded thereon, and through the flange of which bolts 91 join it to the carrier end. Spindle carrier 54 and slide support 89 are thus, in effect, integral or one piece. At its other or tail-stock end, tube 89 is stoutly supported by a bearing 92 in housing 53. Encircling and slidably supported by tube 89 is tool slide 93.

For indexing the spindles, carrier end plate 55 is provided with equi-spaced slots 94 corresponding with all of the stations of the spindle carrier (see Figs. 2 and 10) with which a roll 95 on index disk 96 interacts as disk 96 revolves about shaft 97 so that carrier 54 is rotated ⅙ of its cycle of movement for each revolution of disk 96 after the fashion of the well-known Geneva motion. Disk 96 has a worm gear 98 fixed to one side, meshed by worm 100 on a shaft 101 connected by coupling 102 with its own driving motor 99. Carrier 54 is thus indexed by its own motor 99 (see Figs. 9 and 10).

Indexing disk 96 has in one side (see Figs. 2, 8, 9 and 10) a cam groove 103 with which a roll 104 on arm 105 coacts. Arm 105 is keyed to shaft 106 to which is also keyed the male part 107 of a toggle arm, the female part 108 of said arm being connected by link 109 with one end of a wedge 110 so that movement of arm 105 about the axis of shaft 106 causes longitudinal movement of wedge 110. The connection between arm 105 and wedge 110 is yieldable because a spring 111 is placed between the two parts 107 and 108 of the toggle arm. Movement of this wedge under toggle thrust pushes down pins 112, slidable in bushings 113 against the pressure of springs 114. Pins 112 are two in number and are spaced apart to bear at separated points upon the flattened sides of the carrier 54 and thereby accurately fix and bind it in indexed position. Preferably the pin ends contact with hardened steel disks 115, fixed to the carrier periphery. The powerful easy opposite side pressure from the wedge seats the carrier against the housing 51. When by movement of lever 105 in the opposite direction the wedge is withdrawn, pins 112 are caused to move away from the carrier by springs 114, thus releasing the seating pressure on carrier 54 and leaving it free to turn for indexing. Pins 112 and wedge 110 are relatively so located and formed that if for any reason springs 114 should not lift pins 112 when the wedge is retracted, the rotation of carrier 54 would push pins 112 out of the way as the retracted wedge provides space for them. The wedge and pin device makes a positive and simple means for locking and binding the carrier. Cam 103 is so located on disk 96 in relation to roll 95 that in one rotation of disk 96 the wedge 110 is first withdrawn; the carrier 54 is then indexed and wedge 110 is then seated, and as these indexing and locking operations are performed by the same member (disk 96) there is no possibility of any mishap.

When binding pressure on carrier 54 is released by the retraction of wedge 110, the carrier 54 is supported on rollers 116, mounted on shafts 117 (see Figs. 2 and 8). These shafts are eccentric and each has a fixed arm 118, connected by rod 119 to the other arm, the arms standing at the same angle so that by movement of the rod in one direction, there is always a tendency to rotate both shafts 117 so that rolls 116 will press against the bottom of and support carrier 54. The rod 119 is so moved by a spring 120 that it bears at one end against web 121 that is part of housing 51. The strength of spring 120 and the various leverages involved are so computed that spring 120 will lift carrier 54 so that it is free to rotate on the rolls 116 and thereby prevent wear in its seating, but, of course, under the wedge pressure exerted on pins 112, will seat carrier 54 in its housing against the pressure of spring 120.

Tool slide

Referring to Figs. 2 and 6, it will be seen that tool slide 93 is slidably mounted by adjustable bearings 135 on tube 89 and has a laterally projecting head 136 surrounding slidably stationary bar 137 parallel with the tube 89 and supported by housings 51 and 53. Bar 137 is provided with bearing plates 138 on opposite sides with which gibs 139 in head 136 slidably coact. Thereby slide 93 is prevented from turning by its connection with bar 137. The tool slide 93 is provided with six substantially horizontal bores 140 which are respectively located in line with the axes of the spindles 56 and in which tool heads 240, drills, etc., may be inserted. The tool slide (see Fig. 6) is also provided with six faces 141 on which tools may be fixed. It is also bored out in two diametrically opposite corners for stop rods 142, one end of which is fixed in rear housing 53 (see Fig. 2) which stop rods are free to slide through the bores in tool slide 93. Threaded on the end of stop rods 142 are adjustable stop collars 143 so located that when tool slide 93 reaches its extreme forward position, it abuts against these stop collars and thereby is brought to a positive stop. These collars may be reached for adjustment by removing cap plate 144.

Power is applied to tool slide 93 for traversing it back and forth by bar 145, Fig. 2, which is within and concentric with tube 89 and the connection with which is by a thimble 146, adjustable along said rod. Surrounding tube 89 and confined between side shoulders in slide 93, but free to rotate, is ring 147 radially bored to receive bushings 148 in which are inserted pins 149. These pins and bushings project through longitudinal slots 150 in tube 89 and the inner ends of the pins enter a groove 151 in thimble 146 and, thus, rod 145 and tool slide 93 are connected so as to allow tube 89 which is rigidly fixed to and a part of carrier 55, to rotate while tool slide 93 and rod 145 and thimble 146 remain stationary. Fastened to thimble 146 at one end and concentric therewith is tube 152, to the other end of which is keyed gear 153 which meshes with and can be driven by long pinion 154 by a crank applied to the square end 155 of the pinion. Thus thimble 146 can be rotated with relation to bar 145 and as it is threaded on said bar its longitudinal position along the bar may be adjusted. Thimble 146 is normally prevented from rotation with respect to bar 145 by clutch 156 slidably keyed to bar 145 and whose teeth engage with corresponding teeth on gear 153, when forced in engagement by nut 157. By loosening nut 157 coil spring 158 between gear and clutch forces clutch 156 out of engagement with gear 153 and the latter may be turned.

Bar 145 is kept from rotating by roll 159 on the end of stud 160 placed in a diametrical hole in bar 145, which roll is in a longitudinal groove in a block 161, in a horizontally projecting arm 162 located in holes in housing 52. Said arm 162 is kept from rotating by pins 163 (see Fig. 3) fixed in gear housing 52. Side thrust on bar 145 is taken up by rolls 164 supported in bar 145 by radial pin 165 and bearing on plate 166 (Fig. 3), firmly fixed in arm 162. Pin 160 is revolvably held in bar 145 by ball bearings 167 and 168 and has its end formed into a cam roll 169 which runs in a groove in cam 170 bolted to the periphery of cam drum 171. As cam drum 171 revolves, traverse motion corresponding to the shape of the groove in cam 170 is imparted to bar 145 and thus to tool slide 93.

For taper turning the slide 93 as it reciprocates may be given a slight rotary motion about its longitudinal axis as by making the surfaces of the bearing plates 138 at an angle or oblique to the longitudinal axis of bar 137.

*Tool slide cam drum*

Cam drum 171 (Figs. 2 and 3) is free to rotate on a horizontal stud 172 fixed in bushing 173 firmly fixed in gear housing 52. On the outside of bushing 173 is revolvably located worm gear spider 174 carrying worm gear 175 and secured by pins 176 to drum 171 for rotating drum 171 by worm gear 175. The end of drum 171, opposite worm gear 175, is provided with a roller thrust bearing 177 which abuts against bushing 178 screwed in plate 179 bolted to gear housing 52 and, thus, longitudinal or axial movement of drum 171 in that direction is prevented. This end bearing takes the thrust generated in returning tool slide 93 from working position. Longitudinal movement of drum 171 in the other direction and the thrust generated by tool slide 93 moving to its working position, and also the thrust generated by the tools in cutting is taken by thrust plate 180, bolted to worm gear 175 and coacting with roller 181 held in arm 162 by roller bearings 182. Arm 162 abuts against thrust plate 183 which is screwed on bushing 68, bolted to and therefore an integral or a unitary part of spindle carrier 54. It will be seen that the thrust generated by tools carried by tool slide 93 against the work in spindles 56 is so taken care of or compensated for that in that respect the mechanism is self-contained.

Spindle carrier 54 is held against longitudinal or axial movement by thrust bearing 187. This may be adjusted by threading bushing 188 in rear housing 53, and by adjustment of this bushing all longitudinal movement of carrier 54 is taken up through bearing 187, tube 89, housing 54, plate 55, bushing 68, collar 183, sleeve 162, roller 181, plate 180, worm gear 175, spider 174, drum 171, thrust bearing 177, bushing 178 and plate 179.

*Feed gearing*

Worm gear 175 is rotated by worm 189 keyed to shaft 190 (see Figs. 2, 3 and 13) journalled in gear housing 52 by suitable bearings, and has keyed to it gear 191 meshing with pinion 192 keyed to shaft 193. Thus drum 171 is rotated at a fixed speed relative to shaft 193. Shaft 193 and, therefore, drum 171 has two rates of revolution, one a slow speed for feeding, which speed is in direct relation to the spindle speed, and the other, a fast constant speed for idle movements. Either of these speeds may be automatically given to shaft 193. Slow speed for feeding is imparted to shaft 193 (see Figs. 2, 3 and 12) from spindle drive gear 134 which is an integral part of gear 67 and which, therefore, rotates at a fixed speed relative to that of spindles 56. To this end gear 194 meshes with and is driven by gear 134 and is keyed to one end of shaft 195 journalled in gear housing 52 by suitable bearings. To the other end of shaft 195 is removably keyed pinion 196, meshing with gear 197, removably keyed to shaft 198 which shaft is journalled in gear housing 52. Access to these gears for changing may be had by removing plate 52b, and by changing these gears the speed ratio between shafts 195 and 198 may be varied. Integral with shaft 198 is worm 199 meshing with and driving worm gear 200, that rotates loosely on shaft 193 and drives clutch head 201 (Fig. 13), also rotating loosely on shaft 193 by a well known ratchet roller device 403 so that gear 200 drives clutch head 201 when it is revolving faster than the latter, and when clutch head 201 is revolved faster than worm gear 200, the roller ratchet allows it to run away from the worm gear. Clutch head 201 may be clutched to or declutched from shaft 193 by friction clutch 202 operated by clutch yoke 203 through thimble 204, and when so clutched shaft 193 is either driven by the spindle drive gear 134 at a speed in direct ratio to the spindle speed or at a fast speed for idle movements by motor 205 which is directly connected to shaft 193 by pinion 206 and gear 207, and when energized revolves shaft 193 at a comparatively high speed, clutch head 201 running away from worm gear 200 by its ratchet roller connection if clutch 202 is engaged.

When clutch head 201 is declutched from shaft 193 by friction clutch 202 and motor 205 is deenergized, shaft 193 and, therefore, drum 171 are stationary and it is necessary to operate this clutch only when the feed cycle of the machine is stopped, or when the tool slides are to be fed manually. This latter is necessary as the manual feed is accomplished through the motor 205 which may be run in either direction and which, if run in the reverse direction with clutch 202 engaged, would jam the roller ratchet device 403 by which worm gear 200 drives clutch head 201.

Clutch 202 is, as previously stated, operated by clutch yoke 203 through thimble 204 and clutch yoke 203 may be automatically operated by dog 264 (see Fig. 3) fixed to cam drum 171 through finger 265 of lever 266, pivoted on stud 267 and connected by connecting rod 268 with yoke 203.

Drum 171 can now only be revolved by motor 205 and as it revolves on the fast motion driven by this motor, dog 264 acts on finger 269 on lever 266 and, through the same connections, throws in clutch 202.

Clutch yoke 203 may be operated by hand lever 270 (see Figs. 1 and 3) keyed to shaft 271, to the other end of which is keyed link 272 which, by connecting rod 273 and link 274 keyed to shaft 275, operates yoke 203 which is also keyed to shaft 275.

Cross slide construction

Referring to Figs. 1, 2 and 7, it will be seen that for facing cuts and the like, cross slides are provided as shown, four in number. It is apparent that more or less than four may be easily and conveniently applied. As all cross slides shown are alike in construction and operation, description of but one is necessary. Bolted to carrier housing 51 is cross slide base 209 which is adapted to receive a single cross slide, as shown by the illustration a on Fig. 7, but these cross slide bases may be constructed in the manner shown at b, Fig. 7, so as to receive two cross slides on opposite faces thereof in cooperative relation with the spindle carrier 54. Gibbed in suitable ways on this base 209 is cross slide 210. Longitudinally adjustable in slide 210 is block 211 in which is rotatably mounted cam roll stud 212 so that the inner end of stud 212 engages a groove in the cylindrical cam 213. Block 211 may be longitudinally adjusted in slide 210 by adjusting screw 214, and when so adjusted is firmly held in place. A stop screw 215, adjustably fixed in base 209, engages block 211 when the latter is in its extreme forward position and, thus, backlash between cam roll 212 and its actuating cam 213 is taken care of. A cover 216 is provided for slide 210 to prevent the entrance of dirt, chips, etc.

Cam 213 rotates freely on stud 217 which is so mounted in base 209 that it cannot revolve but may have a certain amount of longitudinal movement. Also rotating freely on stud 217 is worm gear 218 to which is bolted clutch plate 219 adapted to mesh with clutch plate 220 fixed to cam 213 and when the clutch plates are in mesh cam 213 is driven by worm gear 218. By unscrewing bushing 221, which is screwed in end plate 222, it abuts against collar 223 on shaft 217 and its continued movement causes it to pull out shaft 217 and thus pull cam 213 out of engagement with worm gear 218. The relative positions of cam 213 and worm gear 218 may now be altered for the purpose of timing. Cam 213 may be removed for the purpose of substitution, or the like, a slot (not shown) being provided in the end of cam 213 and cam plate 220 to allow cam roll 212 to clear itself. The thrust of slide 210 in feeding direction is taken by anti-friction bearing 224, and thrust in the opposite direction is taken by thrust washers 225. Worm gear 218 is driven by bull gear 226 through intermediate gear 227 and gear 228, which is keyed to shaft 229, rotatably supported in base 209 and carrier housing 51, and which shaft 229 has a worm 230 meshing with worm gear 218. In a similar way all cross slides receive their motion from bull gear 226 (see Figs. 2 and 7). With respect to the type of cross slide base b, shown in Fig. 7, where the cross slides thereon are in closer proximity, the shaft 229 carries the gear 227 which is in mesh with bull gear 226 and the worm 230 on the shaft 229 engages, on opposite sides thereof, the worm gears 218 of the cross slide mechanism of the two cross slides mounted on the single base. This construction is compact and desirable where it can be used as it conserves space and eliminates operating parts.

Bull gear 226 is carried by and rotatably mounted upon the periphery of the end plate 55 of the spindle carrier 54 and is driven from shaft 193 (see Figs. 2, 3 and 12) through worm 236 and worm gear 237 keyed to shaft 238 journalled in gear housing 52. To one end of shaft 238 is keyed pinion 239 meshing with and driving bull gear 226. The ratio of gearing between shaft 193 and feed cam drum 171 is the same as the ratio of gearing between shaft 193 and cross slide cam drum 213, and, therefore, each drum makes a revolution in the same time, and one revolution is a working cycle of the machine.

Rotatable tool holder construction

It may be advisable or desirable to have tools carried by tool slide 93 for operating on work carried by chucks 356 on spindles 56, and which revolve in doing their work and are not stationary. Referring to Fig. 2, it will be seen that provision is made for such operation of tools by mounting in each of the apertures 140 of the tool slide 93 a sleeve 240. Since the construction and operation of these sleeves is the same in all instances, only one will be described. The sleeve 240 has a longitudinal, but not a rotatable adjustment in the aperture 140 and when so adjusted it is fixedly clamped. Rotatably mounted in sleeve 240 is spindle 241 held against longitudinal movement in sleeve 240 and provided with an axial hole 242 that reaches from its outer end inward and at its inner end terminates in a radial hole 243 that leads to a fluid tight chamber 244 in a bushing 245 fixed in sleeve 240. Fluid may be led to chamber 244 from pipe 246 through port 247 and thus a fluid cutting compound, for example, may be forced to the outer end of spindle 241 through hole 242 from a source of supply not shown.

The rear end 248 of spindle 241 is castellated that it may be rotated by, but free to move longitudinally in sleeve 249 journalled in bearings in rear housing 53. Keyed to sleeve 249 is gear 250 driven by gear 251, either directly or through an intermediate 252 (Fig. 5). It will be seen that by providing sufficient number of intermediates 252, a sleeve 249 rotatable by gear 251 may be provided for each spindle station. Gear 251 is keyed to shaft 253 journalled in rear housing 53 and to which shaft is removably keyed gear 254 meshing with pinion 255 removably keyed to shaft 256, also journalled in rear housing 53. Access to gear 254 and pinion 255 for change may be had by removing plate 257 and these gears may be changed for the purpose of altering the rotative speed of sleeve 249. Keyed to shaft 256 is worm gear 258 meshing with worm 259 on shaft 260 driven by its individual motor 261 through pinion 262 and gear 263 (see Fig. 5) and therefore sleeves 249 are driven by motor 261 at a speed which may be varied by means of change gears 254 and 255 for the purpose of rotating a tool, or in some cases work carried by the spindle 241.

Spindle chucking

For chucking, is provided a power-operated differential chuck 356 (Figs. 1, 2, 7 and 8) at the front end of each of the spindles 56, which chuck has extending rearward through the spindle a shaft 357 on the back end of which is a clutch face 358. As a spindle carrier 54 indexes to move a spindle 56 to the loading station, the shaft 357 is brought in line with a motor 359 (Figs. 3 and 11) supported in gear housing 52, on the shaft of which is keyed a driver 360, provided with external gear teeth which mesh with internal gear teeth on a sliding clutch sleeve 361, this clutch sleeve being provided with a clutch face 362 which can be made to mesh with the clutch face 358 on the chuck operating shaft 357. Clutch 361 is thrown in and out of mesh with clutch face 358 by a cam 363 on the periphery of the index disc 96. The cam acts on a roll 364 on one end of yoke lever 365 pivoted on stud 366, the other end of said yoke lever acting on sleeve 361 to shift the same. A spring 367 always tends to throw clutch sleeve 361 into mesh with clutch face 358 and it is allowed to do so when indexing disc 96 is in its stopped position, and when in mesh, chuck 356 can be operated by switching into circuit motor 359, by means of switch 368 (see Fig. 1). As the index disc 96 starts its revolution, cam 363 acting on cam roll 364 withdraws clutch sleeve 361 from engagement with clutch 358 and holds it withdrawn during the period of indexing of the spindle carrier 54, and at the finish of the index allows it to be again forced into mesh by spring 367.

*Electrical control*

Because of its flexibility, or adaptability and dependability, we utilize electricity for the control of the members of the organization constituting the embodiment of our invention and, as hereinbefore described, we utilize a separate motor 122 for driving the spindle, motor 99 for indexing the spindle carrier, motor 205 for operating the tool slides on their fast or idle movements, motor 261 for operating revolving tools and motor 359 for opening and closing the chuck. It is important that these motors be so interlocked that certain functions are only operative at certain times. For example, the motor 99 for indexing the spindle carrier should be held inoperative except when the tool carrying slide 93 is at a predetermined position with respect to the spindles and it is also important that the slide motor 205 for the fast motion of the tool slides be inoperative except when the spindle carrier is stationary and, therefore, when the index motor 99 is stationary with all indexing functions completed. This interlocking of functions is taken care of by limit switch 306 which is operated by a fixed dog 307 on index disc 96 and limit switch 297 which is operated by a fixed dog 299 on slide drum 171 (see Figs. 1, 3, 10, 14, 15, 16 and 17).

The dog 307 operates the plunger 319 of limit switch 306 through levers 323 against the pressure of a spring 324 which normally urges the plunger 319 in a right hand direction, as shown in Fig. 15, through the medium of collar 352 pinned to plunger 319. Plunger 319 has three contact disks 325, 326, and 327 loosely mounted on it and insulated from it. These contactors are so located by shoulder 330, collars 331 and 332, and springs 328 and 329 that when plunger 319 is operated on by dog 307 and plunger 319 is in the position shown in Figs. 15, 16 and 17, contacts 326 and 327 are closed and contact 325 is open. As dog 307 is moved out of engagement with finger 323 and plunger 319 is acted upon by spring 324, contact 325 first closes, contact 326 then opens, followed by the opening of contact 327. In a converse manner, when dog 307 acts on lever 323 to move plunger 319 against the pressure of spring 324, contact 327 first closes, then contact 326 closes, followed by the opening of the contact 325.

Limit switch 297 (see Figs. 14, 16 and 17) has a plunger 298 operated by dog 299 on slide cam drum 171, through plunger 333 and lever 334 pivoted on pin 335, against the pressure of spring 349 which acts on plunger 298 through collar 343. On plunger 298 contact disks 336, 337 and 338 are loosely mounted, positioned by springs 339 and 340, shoulder 341 and collars 342 and 343 on plunger 298 so that when dog 299 pushes plunger 298 against the pressure of spring 344, contacts 337 and 338 are closed and contact 336 is opened. As dog 299 moves out of engagement with plunger 333, plunger 298 is pushed by spring 344 to first close contact 336, then to open contact 338, and then to open contact 337, in this sequence. Conversely, when dog 299 pushes plunger 298 against the pressure of spring 344, contact 337 first closes, then contact 338 closes, and finally contact 336 opens.

It is obvious that if a motor running at its synchronous speed is deprived of power or cut out of circuit that the inertia of the armature and other rotating parts will cause an over-running or coasting beyond the point where it is desired to stop, and it is important that this over-run be eliminated or reduced to the minimum. With alternating current motors the practical way of eliminating this over-run is by "plugging" or, in other words, at the instant of cutting out the current from the motor, to apply a reversing current to the motor, this reversing current being broken immediately after the motor starts to actually reverse the direction of rotatation of its armature. We, therefore, provide plugging switches for both the index motor and the slide motor and it is obvious that such a plugging circuit could also be applied to the spindle motor, the high speed drill motor, or any of the motors used if such was desirable.

We illustrate the electrical circuit in Figs. 16 and 17, Fig. 16 being an actual wiring diagram of the machine and Fig. 17 being a so-called simplified wiring diagram. Like numbers refer to like elements on the two diagrams, Figs. 16 and 17, and for easy understanding all interlocks or switches controlled by a relay bear the number of that relay with a sub-numeral. It is understood that a relay consists of a solenoid operated switch or switches, which switches are called interlocks, but, of course, any other similar instrumentalities may be used for accomplishing the same purpose. These switches or interlocks consist of two types; normally open, which means that the switch is opened when the solenoid is not excited and closed when the solenoid is excited, and normally closed, which means that the switch is closed when the solenoid is not excited and open when the solenoid is excited. In Fig. 17 a normally open interlock is shown by two parallel vertical lines with no connection between them, and a normally closed interlock is shown by two parallel vertical lines connected by a diagonal line.

We further provide in the electrical circuit a number of hand operated switches, preferably of the push button type and dog operated switches. Both the hand and dog operated switches bear the numeral of the solenoid which they control, with the sub-letter H in the case of hand operated switches and the sub-letter D in the case of the dog operated switches. Also if the hand push button or the dog operated switch is normally open, it carries a sub-letter G and if it is normally closed it carries a sub-letter S. For example, a normally open hand operated push button controlling solenoid 317 will carry the number 317—GH, and a normally closed hand operated push button controlling the same solenoid will carry the number 317—SH. For simplicity and clarity, we also letter certain terminals and connections, particularly on Fig. 16, and it is understood that terminals having the same letters are always normally electrically in circuit.

As hereinbefore described, we also provide a hand lever 270 by which shaft 193 can be connected or disconnected by means of clutch 202 with worm gear 200. When connected with said worm gear the machine is said to be under automatic control and movement of lever 270 to connect this clutch also throws switch 307a into the automatic control position, as shown in Figs. 16 and 17, and movement of lever 270 to disconnect clutch 202 throws switch 307a into the hand or manual control position.

As the control of the spindle motor and the high speed drilling motor is the same whether under manual or automatic control, we will first describe it.

Spindle control

The main spindle motor 122 is controlled through a contactor 276, of known construction, from push button station 277 (see Fig. 16). Current flows from main line wire 278 to connection A on panel board 279, thence to connection A on push button panel 280 (see Figs. 1 and 16) and thence to connection A on push button 277. By depressing button 281—GH connection is made between A and b and current flows back to connection B on panel 279, thence to connection B on contactor 276 through solenoid 281, thermally operated safety device 283 to thermally operated safety device 283a of the high speed drill motor 261, thence to connection F on panel 289 and back to the main line wire 284, thus completing a circuit that energizes solenoid 281 whose plunger or core operates three-way switch 285 to close the latter and start motor 122. Energizing solenoid 281 also closes holding interlock 281—1 so that holding current flows through connection C back to push button station 277 where C is connected with B through limit switch 281—SH, and thence back to connection B in contactor 276 and through solenoid 281 and safety contacts 283 and 283a to main wire 284. This provides a closed holding circuit so that when button 281—GH is released and the connection between A and C on panel 280 is broken, this holding circuit will keep switch 285 closed. To stop motor 122 it is only necessary to break this holding circuit which may be done by depressing button 281—SH. This holding circuit may also be broken in case of overload on either motor 122 or motor 261 by thermally operated safety switches 283 or 283A.

If hand switch 290 is closed, solenoid 291, operating three-way switch 292 which controls high speed drilling motor 261, is in parallel with solenoid 281 of the main spindle contactor 276 and, therefore, motor 261 will start and stop with motor 122. Also, if either the main spindle motor 122 or the high speed drill motor 261 are overloaded both motors will stop.

It is never necessary to operate the high speed drill motor 261 except when the spindle motor 122 is operated but it is sometimes desirable to operate the latter without the former which may be done by opening manually operated switch 290.

Automatic control

As hereinbefore stated, by operation of hand lever 270, switch 307a may be thrown into the position shown on Figs. 16 and 17 connecting live line wire 278 through connections A with the automatic control line wire 278a through terminals H. Accordingly all connections H are connected with the live line wire 278 and therefore all connections A and H are alive and the machine is in condition for automatic operation.

The automatic cycle of operations is as follows: Assume the tool slides to be stopped at the extreme rear positions. Dog 299 is so located on the slide drum 171 that at this time switch plunger 298 is fully thrown by the dog, occupying the positions shown in Figs. 14, 16 and 17 and as the spindle carrier is completely indexed, dog 307 on index disc 96 will be in such a position that switch plunger 319 is fully thrown by dog 307 to the positions shown in Figs. 15, 16 and 17. The operator having finished chucking a piece at the loading station presses reset button 310 (see Figs. 1, 16 and 17) completing a circuit through solenoid 345 if the spindle motor is running so that interlock 281—2 is closed, but if the spindle motor is not running this interlock will be open and no circuit will be formed. This is desirable as slide operation should not be started unless the spindle motor is running.

Energizing solenoid 345 closes interlock 345—1, thus completing a holding circuit through solenoid 345 through closed switch 327 so that when the operator allows switch 310 to open solenoid 345 remains energized. Energizing solenoid 345 also closed interlock 345—2 forming a circuit through solenoid 314 through switch 337 and overload relief switch 315 if the interlock 281—2 is closed, which it will be if the spindle is running. Therefore, the index motor cannot be started unless the spindle motor is running.

Energizing solenoid 314 operates the three-way switch plunger 316 to close the ahead circuit to the index motor 99 and start the same in the direction shown by the arrow on Fig. 16. The energizing of solenoid 314 also opens normally closed interlock 314—1 which prevents current from going through the starter solenoid 317 of the slide operating motor switch 293. Therefore, the slide motor cannot operate while the index motor is operating.

The energizing of solenoid 314 closes normally open interlock 314—2, completing a circuit through solenoid 350. This excitation of solenoid 350 closes interlock 350—1 which completes a holding circuit through coil 350 through switch 338, and also closes interlock 350—2, but as interlock 314—1 in the circuit with interlock 350—2 is open no circuit is completed by the closing of interlock 350—2.

When the indexing motor 99 starts, plugging switch 402 closes, but as normally closed interlock 314—3 has previously been opened by the energizing of solenoid 314 no circuit is formed. This plugging switch is of well known construction and is frictionally revolved by the shaft of the motor, which it controls, in such a manner that the switch is closed by the ahead rotation of the motor, is opened by the reverse rotation of the motor and will open itself by gravity if the motor is stationary.

When the index motor starts index plate 96 revolves and dog 307 leaves plunger 319, thus allowing spring 324 to operate plunger 319, first closing switch 325 which completes a holding circuit through the index motor starter solenoid 314 (Figs. 16 and 17). Further movement of plunger 319 opens switch 326 preventing any current flowing through the slide motor starter solenoids 317 or 321 while index is taking place, thus preventing operation of the slide during indexing. Further movement of plunger 319 opens switch 327 breaking the circuit through solenoid 345, thus opening holding circuit interlock 345—1 and also the starting circuit interlock 345—2 for the index motor solenoid 314. But as a holding circuit has already been formed through solenoid 314, as hereinbefore explained, it remains energized.

The indexing motor 99 and its controlled index disc 96 continues to revolve and at the end of one revolution of disc 96 which, as hereinbefore described, indexes the spindle carrier from one station to the other, dog 307 again operates plunger 319 through the intermediary lever 323 (see Fig. 15). This first closes switch 327 but as interlock 345—1 is open no circuit is completed through solenoid 345. It then closes switch 326, but as interlock 314—1 is open no starting circuit is completed through solenoid 317. It then opens switch 325. This breaks the holding circuit through solenoid 314, cutting off ahead current from index motor 99, opening interlock 314—2 which causes no change as switch 338 completes a holding circuit through solenoid 350, and closing interlock 314—3. Closing this latter interlock energizes index motor reverse solenoid 401 as the plugging switch 402 is closed, thus sending a reversing current through the index motor 99 which stops it and starts to reverse it. Immediately when this reverse starts plugging switch 402 opens breaking the circuit through the reverse switch solenoid 401 and thus cutting off the reversing current to index motor 99. The effect, therefore, is to stop the index motor practically instantaneously.

De-energizing of solenoid 314 also closes interlock 314—1 completing a starting circuit through interlocks 314—1, 350—2, solenoid 317 and switch 326. The energizing of solenoid 317 closes slide motor ahead switch plunger 320 (Fig. 16) starting the slide motor 205 ahead. It also closes interlock 317—1 and the motor itself, as it starts ahead, closes plugging switch 405, completing a circuit through solenoid 406. Energizing this coil closes holding circuit interlock 406—1 and also interlock 406—2, the closing of this latter interlock causing no change as the normally closed interlock 317—2 has previously been opened by the energizing of solenoid 317. The energizing of solenoid 317 also closes its holding circuit interlock 317—3.

The slide motor 205 is now revolving the slide cam drum 171 ahead and dog 299 leaves plunger 298 allowing spring 344 (see Figs. 14, 16 and 17) to operate it, first closing switch 336 which completes a holding circuit through solenoid 317 through push button 317—SH, dog switch 317—SD and interlock 317—3. Further action of plunger 298 opens switch 338. This breaks the holding circuit through solenoid 350, opening its holding interlock 350—1 and opening interlock 350—2, thus breaking the starting circuit through solenoid 317. Further movement of plunger 298 opens switch 337, but as no current is flowing through the switch no change takes place.

Motor 205 continues to revolve advancing the slides on their fast motion until a dog 301 adjustably located on slide drum 171 (see Figs. 3, 14, 16) through the medium of lever 303 opens switch 317—SD, breaking the holding circuit through solenoid 317 and thus opening the ahead switch of the slide motor 205. De-energizing solenoid 317 opens holding circuit interlock 317—3 so that when the dog leaves the switch 317—SD, allowing it to close, the holding circuit through solenoid 317 will remain broken. De-energizing of solenoid 317 opens interlock 317—1, but as interlock 406—1 is closed the holding circuit continues to flow through solenoid 406. De-energizing solenoid 317 also closes interlock 317—2 and as interlock 406—2 is closed a circuit is completed through solenoid 321 which, through switch plunger 322, closes the switch and sends a reverse current into motor 205. This causes the motor to stop and then start to reverse, but the instant that it starts to reverse plugging switch 405 opens, breaking the circuit through solenoid 406. This action opens interlock 406—2 thus breaking the current through solenoid 321 and opening the reverse switch of motor 205, the effect being to stop the slide motor practically instantaneously.

De-energizing of solenoid 406 also opens its holding circuit interlock 406—1. This is necessary since the rotor of motor 205 is positively connected with shaft 193, which shaft is, as hereinbefore described, rotated from the spindle drive means when the machine is on the feeding cycle. The rotor, therefore, of motor 205 is idly revolved by this shaft and plugging switch 405 will close, and unless interlock 406—1 is open, a circuit will be formed through solenoid 406 which would close interlock 406—2 and supply reverse current to motor 205.

The drive to drum 171 is now picked up by worm gear 200 through its roller ratchet clutch 403, as hereinbefore described, and drum 171 is revolved at a slow speed for its cutting operation. At any desired point in the cycle, as for instance when the tools finish their work on the subject piece, an adjustable dog 300 is set on drum 171 so that through arm 303 it closes switch 317—GD. As switches 317—SH, 317—SD and 336 and 326 are closed, a circuit is formed through solenoid 317, starting the slide motor 205 ahead, closing the various holding circuit interlocks for solenoid 317, and resetting the various plugging circuit interlocks so that the plugging circuit will again function when motor 205 is again stopped, in the same manner as hereinbefore described.

Motor 205 now drives feed shaft 193 and its controlled slides at the fast speed for idle movements.

While the feeding cycle has been going on the operator has been chucking a piece of work in the spindle at the loading station and as soon as he finishes chucking he may close reset switch 310. If the operator closes the switch 310 the machine will not stop after it has finished its cycle of operations, but another cycle of operations, such as indexing the spindle carrier, advancing the tools to the work, feeding the tools while cutting, and returning the same to their rear position, will take place. If he does not close reset switch 310 the machine will stop on completion of the cycle, except for the operation of the spindle motor 122. This feature acts as a safety in that it precludes, for example, the indexing of the spindle carrier while the operator is chucking a piece of work, or the moving of the tools into cutting position while he is chucking a piece of work, which operations would be extremely dangerous to the operator. It does also allow him, after he has finished chucking a piece of work, to close the reset switch and leave the machine, as for example to operate another machine, with the assurance that the machine will continue its cycle and no time will be lost.

The manner by which this is accomplished is as follows: Closing switch 310 completes the circuit through solenoid 345, the energizing of which closes its holding circuit interlock 345—1 and interlock 345—2. The closing of this latter interlock partially completes a circuit through solenoid 314, but as switch 337 is open except when plunger 298 is operated by dog 299, (which takes place only when the tool slide has reached its extreme rear position with respect to the chuck) the circuit is not completed. When the tool slide reaches its extreme rear position, dog 299 operates plunger 298, first closing switch 337, completing the circuit through solenoid 314, thus starting the indexing motor 99 in the manner hereinbefore described. The energizing of solenoid 314 also opens interlock 314—1 breaking the starting circuit through solenoid 317 and thus preventing starting of the slide motor 205 while index is taking place. Energizing of solenoid 314 opens interlock 314—3 which prevents the index plugging circuit from operating as plugging switch 402 is closed by the starting of the index motor 99. Energizing of solenoid 314 also closes interlock 314—2 completing a circuit through solenoid 350, the energizing of the latter closing its holding interlock 350—1 and interlock 350—2, but as interlock 314—1 is open no starting circuit through solenoid 317 is formed. Plunger 298 then opens switch 336, breaking the holding circuit through the slide motor ahead solenoid 317 and stopping the slide motor 205 through the plugging circuit as hereinbefore described. The cycle now repeats itself.

If the operator does not close reset switch 310 before the dog 299 has acted upon plunger 298, the closing of switch 337 by plunger 298 will not start the index motor (as interlock 345—2 will be open) and the slide motor 205, and therefore the feed shaft 193 and its connected tool slides, will simply come to a stop upon the opening of switch 336 by plunger 298.

After the machine has thus stopped the operator may start the cycle at any time by closing reset switch 310 as hereinbefore described.

The operator may at any time during the automatic cycle start the fast idle motion of the slides by closing hand operated switch 317—GH, the closing of which forms a circuit through solenoid 350 and thus through its controlled interlock 350—2 forming a starting circuit through the slide motor operating solenoid 317.

The operator may stop the slide motor at any time during the automatic cycle and thus change from fast idle movement to slow feeding movement by opening hand operated switch 317—SH, the opening of this switch breaking the holding circuit through slide motor controlling solenoid 317.

Manual operation

As hereinbefore described clutch 202 can be operated by hand lever 270 to disengage shaft 193 from worm gear 200 and this movement of hand lever 270 also acts to throw transfer switch 307a, to which it is operatively connected, into the manual control position. This disconnects live wire 278 from automatic control wire 278a and connects it with manual control wire 278b. The automatic control switches are now dead and the index motor is controlled by manual push button 311 (see Figs. 1, 16 and 17) and the slide motor 205 may be jogged forward by hand push button 312 and reverse by hand push button 313.

It is necessary that when index is started, either by hand or automatically, that it continue until its completion and that the index motor 99 be plugged to a stop at the finish of the indexing cycle. Therefore, the holding circuit for the index motor solenoids 314 and 401 and the circuit for the plugging switch 402 are taken from the line 278 between the source of electrical supply and transfer switch 307a so that they are operative whether the control is manual or automatic.

With manual operation of the slide motor 205, however, it is desirous that the motor run forward or reverse only so long as the operator keeps the switch 312 or 313 closed. Therefore, the holding circuit for slide motor operating solenoids 317 and 321 and the circuit for the plugging switch 405 are taken from the automatic line 278a and are, therefore, dead when transfer switch 307a is in the manual control position.

To index manually, the operator depresses push button 311. This breaks the circuit to switches 312 and 313 so that the slide motor cannot be operated simultaneously with the index motor, and forms a circuit through the index ahead solenoid 314 if the spindle motor is running so that interlock 281—2 is closed and if the turret slide is in its extreme rear position so that dog 299 has moved switch plunger 298 to close switch 337. It is therefore apparent that index cannot take place unless the spindle motor is running and unless the tool slide is in a certain predetermined position, preferably at the limit of its stroke away from the chuck. Immediately that index starts, dog 307 allows switch 325 to close, forming a holding circuit through solenoid 314, and the operator may then release push button switch. Index motor 99 completes the index and is plugged at the end of the index in the same manner as hereinabove described under Automatic control.

If push button 311 has returned to its normal position the operator may jog the slide motor 205 forward by operating hand push button 312. This first cuts the reverse push button 313 out of the circuit and then forms a circuit through slide ahead solenoid 317 if index has been completed so that switch 326 is held closed by dog 307. It is therefore, apparent that the slide motor can only be jogged manually when index has been completed.

Slide motor 205 may be jogged in the reverse direction by push button 313, the operation of which first cuts out the forward switch 312 and then energizes the slide reverse solenoid 321 if the hereinbefore stated switch 326 is held closed by dog 307.

As the holding circuits for both the slide ahead solenoid 317 and the slide reverse solenoid 321 are connected with the automatic line 278a, which line is dead when switch 307a is in the manual control position, no holding circuits are formed through these solenoids and they are energized to operate the motor only so long as the operator keeps push button 312 or 313 depressed.

Having thus described the invention and one example of how it may be constructed and operated, it is to be understood that we are not to be limited to the exact construction, combination and arrangement of parts herein disclosed as the

What we claim is:—

1. A machine tool comprising an indexable spindle carrier, a hollow tool support fixedly connected with and projecting from said carrier, a tool slide on said support, means for imparting movement to the tool slide towards and from the carrier, said spindle carrier and support being rotatable together, and means to prevent rotation of the slide with them, the slide reciprocating means being within the tool support and having a connection with the slide that is operative regardless of rotation of said support.

2. A machine tool as in claim 1 in which the slide reciprocating means is within the tool support and has a balanced bearing connection with the slide said slide encircling the tool support concentrically.

3. A machine tool as in claim 1 in which the contacting surfaces of tool support and slide are hardened to resist wear.

4. A machine tool as in claim 1 having a frame member spaced from the carrier and which supports the end of the tool support away from the carrier and the tool slide is situated in the space between said frame support and said carrier.

5. A machine tool as in claim 1 wherein the slide reciprocating means comprises a bar situated within and extending lengthwise of the hollow tool support and upon which the slide reciprocating means acts and having a connection between said bar and said tool slide which extends through a longitudinal slot in the wall of the hollow support, said connection permitting rotation of the hollow tool support independently of the slide.

6. A machine tool as in claim 1 wherein the spindle carrier, tool slide and slide reciprocating means are arranged with respect to each other so that the opposing thrusts, caused by the action of the tools in the tool carrying slide against the work held in the spindle carrier, counterbalance each other through the slide reciprocating means.

7. A machine tool as in claim 1 having means to transmit to and resist by the spindle carrier and the tool support thrusts generated in the movement of the tool slide.

8. A machine tool as in claim 1 wherein the slide reciprocating means comprises a cam drum reciprocated bar for imparting movement to said tool slide, and means whereby the thrusts generated by the interaction of said tool slide and drum are self-contained within the spindle carrier and tool support.

9. A machine tool rotatable spindle carrier, an elongated tool slide bearing fixed to said carrier with its axis parallel to the axis of the spindle in said carrier, a tool slide longitudinally movable on said bearing, a bar parallel with said bearing, and means connecting the slide and said bar to prevent the tool slide from rotating on said bearing comprising a head projecting from the slide and surrounding said bar and having sliding bearings on opposite sides of the bar.

10. A machine tool having an indexable spindle carrier supporting a plurality of hollow spindles, a work holder on each spindle, means for operating said work holder extending axially through said spindle, a single reversible driving element that alines with a spindle when at one indexing station and normally disconnected from said spindle, indexing means, and means coacting with the indexing means that positively connect and disconnect said driving element with each work holder operating means as it is placed in and displaced from operative relation to said driving element.

11. A machine tool including a work holder and a tool holder, and means to cause relative and timed movements of said holders, individual motors supplying the power for the motions required, and control means correlating the action of said motors, the motors and control means being electrical.

12. A machine tool including a work holder and a tool holder, and means to cause relative and timed movements of said holders, individual electrical motors supplying the power for the motions required, and control means correlating the action of said motors, said control means being interchangeably manual and automatic and including electric circuits and switches therein arranged to control said operation of said motors at predetermined positions of said holders.

13. A machine tool having work and tool holder elements, a reversible motor for causing relative movement of such elements for coaction of tool and work, and means to prevent continued movement of the motor-actuated element when such movement should be stopped, comprising motor-reversing means acting at substantially the time said movement should be stopped.

14. A machine tool as in claim 13 in which the motor is electrical and is in a circuit that includes a plugging switch.

15. A machine tool having work and tool holder elements, and a member periodically movable to establish working relations between such elements, a reversible motor for actuating said member and means to prevent movement of said member at the end of a period, comprising motor-reversing means acting at substantially the end of such period.

16. A machine tool as in claim 15 having a plurality of periodically movable members with an electrical motor for each, and means for the separate control of the motors.

17. A machine tool as in claim 15 having a plurality of periodically movable members with an electrical motor for each, and means for the separate control of the motors, and certain of the motors being restrained from movement in a reversed direction.

18. A machine tool comprising an indexable spindle carrier, a tool carrier, a tool carrier support fixedly connected with and projecting from said carrier, means within the tool carrier support for imparting movement to the tool carrier toward and from the spindle carrier, said tool carrier support being hollow, said spindle carrier and tool carrier support being rotatable together, the bearing of the spindle carrier being its perimeter, and means to prevent the rotation of the tool carrier, the means for imparting movement to the tool carrier having a connection therewith that is operative regardless of rotation of said tool carrier support.

19. A machine tool as in claim 1, wherein the slide reciprocating means comprises a bar situated within and extending lengthwise of the hollow tool support and upon which the slide reciprocating means acts, a connection between said bar and said tool slide, the wall of the hollow support being slotted for the passage of such connection, said connection permitting rotation of the hollow tool support independently of the slide and making a balanced connection between the bar and the slide so that all stresses are equally spaced about the perimeter of the bar.

20. A machine tool as in claim 9 having means between the bar and the slide to cause the slide to have a partial rotary movement while advancing and retracting from the spindle carrier.

21. A machine tool comprising an indexable carrier, a housing for said carrier, carrier indexing means and means for rectifying the position of the carrier after indexing, said rectifying means also serving to clamp the carrier in its housing, said rectifying and clamping means comprising spaced apart pins that contact with an exterior surface of the carrier.

22. A machine tool including a work-holder and a tool-holder, means to cause relative and timed movements to said holders, comprising a shaft adapted to be revolved at higher and lower speeds, individual motors drivingly connected with said shaft, one being constantly connected therewith for driving it at the higher speed, the means drivingly connecting said shaft with the other motor permitting said shaft, when driven at the higher speed, running away from the lower speed imparting motor; the higher speed motor being run idly by the shaft, when said shaft is driven at the low speed, and means to effect the transition from one speed to the other and means that automatically control the motor connections with the driven shaft and actuated by an operative connection with a moving member of the machine, whereby such control is automatic.

23. A machine tool as in claim 22 in which the driven shaft is operatively connected with the tool holder.

24. A machine tool comprising an indexable spindle carrier, a tool support, individual motors power-connected respectively with spindle carrier, spindle and tool support; and automatic control means starting and stopping said individual motors to time, in relation to one another, the motions of spindle carrier and tool holder.

25. A machine tool, comprising a carrier, a plurality of chucking devices carried thereby, a hollow stem fixed to and projecting from said carrier, means for indexing said carrier and stem as a unit, a non-rotatable tool slide slidably mounted on said stem, means for moving said slide on said stem comprising a member within said hollow stem, and connecting means between said member and said tool slide.

26. A machine tool, comprising a carrier having a plurality of chucking devices thereon, a hollow stem rigidly secured to and projecting from said carrier, a frame part spaced from said carrier and forming a bearing for said hollow stem at a point remote from said carrier, means for indexing said carrier and hollow stem as a unit, a non-rotatable tool slide slidably mounted on said stem between said carrier and said frame part, means for moving said tool slide on said stem comprising a member extending within said hollow stem and through said carrier, and connecting means between said member and said tool slide.

27. A machine tool, comprising a carrier having a plurality of chucking devices, a stem part rigid with said carrier and projecting axially from one side thereof, means for indexing said carrier and stem part as a unit, a non-rotatable tool slide slidably mounted on said stem part, means for moving said slide on said stem part comprising a bar member extending through said carrier, means of connection between said bar member and said tool slide, and means located at the side of said carrier opposite said stem part and cooperating with said bar member for moving the same to move said tool slide.

28. In a machine tool as set forth in claim 21 further characterized by the clamping means comprising a reciprocating member adapted to lock said pins in clamping position against the carrier to firmly hold the same in position and to release said pins to permit indexing of the carrier.

29. In a machine tool as set forth in claim 21 further characterized by the clamping means comprising a reciprocating member adapted to lock said pins in clamping position against the carrier to firmly hold the same in position and to release said pins to permit indexing of the carrier, and an operative connection between said indexing means and said reciprocating clamping member, whereby the clamping member is operated to release and lock said pins in predetermined relation with respect to the indexing of said carrier.

30. In a machine tool, a rotatable work holder, an electric motor for rotating said work holder, a rotatable tool holder, an electric motor for said tool holder, electric circuits for supplying electric energy to said motors including an interlocking means to prevent the supply of electric energy to said tool holder rotating motor unless said work holder rotating motor is energized.

31. In a machine tool as claimed in claim 30 in which the electric circuits for supplying electric energy to said motors are provided with a master switch for de-energizing both motors simultaneously.

32. In a machine tool, a work carrier and a tool carrier, means for indexing them relative to each other including an electric motor drive, an electric circuit for supplying electric energy to said motor including a plugging switch and a running switch, means actuated in response to a predetermined movement of said indexing means for opening said running switch to interrupt the supply of electric energy to said motor and actuate said plugging switch to quickly stop said motor.

33. In a machine tool having work and tool holder elements indexable with respect to each other and movable relatively to each other to bring the tool and work in cooperative position, separate reversible electric motors for causing said movements respectively, means for suddenly stopping each of said motors by applying a reversing current until reverse starts and then immediately cutting it off, other means for causing the relative feeding movement of work and tool holder elements for coaction of tool on the work, and means for disconnecting the reversing current from the tool holder operating motor when said other feeding means is operating.

34. In a machine tool as in claim 33 further characterized by means for preventing operation of the indexing motor when either said other motor or other feeding means is operating the tool holder.

35. In a machine tool, a work carrier and a tool carrier, means for indexing the same including an electric motor drive, an electric circuit for supplying electric energy to said motor including a running circuit and a plugging circuit, means actuated in response to a predetermined movement of said indexing means to de-energize said running circuit, and means operable upon de-energization of said running circuit to energize said plugging circuit.

36. A machine tool as claimed in claim 35 having means whereby the operation of the plugging circuit is positively prevented while said running circuit is in operation.

37. In a machine tool, a tool carrier, means for slidably moving the same including an electric motor drive, an electric circuit for supplying electric energy to said motor including a running circuit and a plugging circuit, means actuated by a predetermined movement of said tool carrier to de-energize said running circuit, and means operable upon de-energization of said running circuit to energize said plugging circuit.

38. In a machine tool, an electric motor drive for indexing a revolvable work holder and a tool holder with respect to each other, an electric motor drive for sliding a tool holder relative to said work holder, and means operable upon actuation of said indexing motor to positively prevent operation of said sliding motor until said indexing motor has completed its operation.

39. In a machine tool, an electric motor drive for indexing a revolvable work holder and said tool holder with respect to each other, an electric motor drive for sliding said tool holder relative to said work holder, and means actuated by movement of said tool holder for positively preventing operation of said indexing motor until said slidable tool holder has returned to a predetermined position.

40. In a machine tool, a work holder, and a cooperating tool holder, means for indexing said holders relative to each other including an electric motor, means for moving said tool holder with respect to said work holder including an electric motor, electric circuits for said motors including a running circuit and a plugging circuit for each motor, means actuated in response to a predetermined movement of said indexing means to de-energize the running circuit for the indexing motor, means operable upon de-energization of said running circuit to energize the plugging circuit for the indexing motor to quickly stop the same and to simultaneously energize the running circuit for the tool holder motor, means actuated by a pre-determined position of said tool holder to de-energize the running circuit for the tool holder motor, and means operable upon de-energization of said tool holder motor running circuit to energize the plugging circuit for the tool holder motor to quickly stop the same.

41. In a machine tool as set forth in claim 40 further characterized by means for moving the tool holder when said tool holder motor is stopped, and means actuated by a predetermined position of the tool holder to re-establish said tool holder motor running circuit and to then de-energize the same and re-energize its plugging circuit and the running circuit of said indexing motor, and interlocking means to prevent simultaneous operation of said motors, and to prevent operation of said indexing means when the tool holder is moved by said other means.

42. In a machine tool comprising an electric motor drive for indexing a revolvable work holder and a tool holder with respect to each other, an electric motor drive for sliding a tool holder relative to said work holder, and electrical interlocking means operable to prevent simultaneous operation of said motors.

43. In a machine tool, a rotatable work holder, an electric motor for rotating said work holder, a rotatable tool holder, an electric motor for rotating said tool holder, and electric circuits for supplying electric energy to said motors, each of said circuits including an electric overload relay so connected that the action of the tool holder motor overload relay causes simultaneous de-energization of both of said motors, and conversely.

44. In a machine tool, an indexable work holder having mounted thereon a plurality of rotatable spindles, an electric motor for indexing said work holder, an electric motor for rotating said spindles, electric circuits for energizing said motors, and means actuated by said spindle motor circuit to permit operation of said indexing motor only when said spindle motor is in operation.

45. In a machine tool as claimed in claim 44 having means for declutching said spindles from said spindle motor including a cam operable by said indexing motor to effect declutching of said spindle from said spindle motor during the operation of said indexing motor and to effect reclutching of said spindles to said spindle motor upon completion of the indexing operation.

46. In a machine tool, a rotatable work holder and tool holders, an electric motor drive for indexing one of said holders with respect to the other, an electric motor drive for sliding a tool holder relative to said work holder, electric circuits for energizing said motors respectively, including automatically operated circuits and manually operated circuits, said automatic circuits including means to render certain of said motors effective and ineffective at predetermined times, said manually operated circuits including switches for rendering certain of said motors effective and ineffective, and a transfer switch for rendering the automatic and manual operation of certain motors effective and ineffective.

47. In a machine tool comprising an electric motor drive for indexing a revolvable work holder and tool holder with respect to each other, an electric motor drive for sliding a tool holder relative to said work holder, electric circuits for energizing said motors, and an electric circuit for controlling the energization of said motor energizing circuits, said control circuit including means actuated in response to movement of said tool holder to positively prevent energization of said indexing motor unless said tool holder is in a predetermined position.

48. A machine tool comprising an electric motor drive for indexing a revolvable work holder and said tool holder with respect to each other, an electric motor drive for sliding said tool holder relative to said work holder, means for energizing said motors, and an electric circuit for controlling said means including instrumentalities controlled by the position of said holders for automatically energizing said motors, said control circuit including a manually operated electric switch for controlling the energization of said indexing motor energizing circuit for manual operation, and manually operated electric switches for controlling the energization of said slide motor energizing circuit for manual operation, the actuation of said first mentioned switch being effective to positively prevent any supply of power by said last mentioned switches, or conversely.

49. In a machine tool the combination of work carrying device and a tool carrying device, means for indexing one of said devices indexable with respect to the other for presenting different tools to the work piece, mechanism for actuating one of said devices with respect to the other device to cause the tools to operate upon the workpiece, said indexing means and mechanism including individual electric motors for operating the same respectively; and automatic control means for starting and stopping said individual motors to time, in relation to one another, the motions of the work carrying device and the tool carrying device.

50. In a machine tool the combination of a work carrying member and a tool carrying member which are indexable with respect to each other and which are movable with respect to each other for performing work, means for driving the tool carrying member synchronously with the work carrying member for work performing movements, means for driving the tool carrying member at a relatively higher constant speed by an individual electrical motor for idle movements, means for indexing the tool carrying member and the work carrying member relative to each other including an electric motor, a control circuit for said electric motors to shift the tool carrier from idle movements to work performing movements, and conversely, depending upon the position of the tool carrying member and also on the position of the indexable member, and control means for said indexing motor dependent upon the position of said tool carrying member, all of said control means including electric circuits for energizing said motors and having switches therein rendering said circuits operative and inoperative according to the position of said members, said circuits further including interlocks therein to prevent concurrent operation of said motors as well as when said tool carrier member is driven synchronously with said work carrying member.

51. In a machine tool as set forth in claim 50 further characterized by said switches in said circuits including both manually and automatically operated switches for effecting manual controlled operation of said motors and automatic recurrent cycles of operations, and a manually operable switch for resetting the automatic control circuits so that the cycle of operations will be repeated only when said reset switch has been operated.

52. In a machine tool which has a recurrent cycle of operations and which has electrical circuits for automatically controlling the cycle of operations including electrical switches therein, and a manually operable switch for resetting the automatic control circuits so that the cycle of operations will be repeated when said reset switch has been operated and will not be repeated unless operated.

WILLIAM WALLACE POTTER.
MYRON S. CURTIS.